(12) United States Patent
Dauneria et al.

(10) Patent No.: US 12,107,694 B2
(45) Date of Patent: Oct. 1, 2024

(54) MANAGING A CHARGING OPERATION IN A COMMUNICATION NETWORK

(71) Applicant: Telefonaktiebolaget LM Ericsson (publ), Stockholm (SE)

(72) Inventors: Ankur Dauneria, New Delhi (IN); Robert Törnkvist, Karlskrona (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 99 days.

(21) Appl. No.: 17/614,640

(22) PCT Filed: Jun. 4, 2019

(86) PCT No.: PCT/EP2019/064556
§ 371 (c)(1),
(2) Date: Nov. 29, 2021

(87) PCT Pub. No.: WO2020/244745
PCT Pub. Date: Dec. 10, 2020

(65) Prior Publication Data
US 2022/0224553 A1 Jul. 14, 2022

(51) Int. Cl.
*H04M 11/00* (2006.01)
*G06K 19/08* (2006.01)
(Continued)

(52) U.S. Cl.
CPC .......... *H04L 12/1471* (2013.01); *G06K 19/08* (2013.01); *H04M 15/51* (2013.01); *H04M 15/8083* (2013.01)

(58) Field of Classification Search
CPC ..... H04L 12/1471; H04L 12/14; G06K 19/08; H04M 15/51; H04M 15/8083; H04M 15/00; H04M 15/07; H04W 4/24
See application file for complete search history.

(56) References Cited

U.S. PATENT DOCUMENTS 6,249,281 B1 * 6/2001 Chen .................. H04L 9/40
715/753
6,501,832 B1 * 12/2002 Saylor .............. H04M 3/4938
379/88.19
(Continued)

FOREIGN PATENT DOCUMENTS

EP 2621155 A1 7/2013

OTHER PUBLICATIONS

International Search Report and Written Opinion of the International Searching Authority for PCT International Application No. PCT/EP2019/064556 dated Feb. 6, 2020.
(Continued)

*Primary Examiner* — Stephen M D Agosta
(74) *Attorney, Agent, or Firm* — Sage Patent Group

(57) ABSTRACT

A method for managing a charging operation in a communication network is disclosed. The method comprises receiving a content specification identifying content, vendors and a condition relating to charging the vendors for provision of the content to a UE. The method further comprises creating a charging policy for provision of the content, which specifies division of charging for provision of the content to a UE between the vendors in accordance with the condition, receiving, from a UE, a request for provision of content over the network and retrieving a charging policy corresponding to the requested content. The method further comprises creating a charging entry for provision of the requested content, the charging entry dividing charging for provision of the requested content between vendors identified in the retrieved charging policy and a subscriber account associated with the UE in accordance with the retrieved policy.

16 Claims, 11 Drawing Sheets

(51) Int. Cl.
*H04L 12/14* (2006.01)
*H04M 15/00* (2006.01)

(56) References Cited

U.S. PATENT DOCUMENTS

| | | | | |
|---|---|---|---|---|
| 8,214,487 | B2* | 7/2012 | Savoor | H04L 43/0876 |
| | | | | 370/254 |
| 8,635,128 | B2* | 1/2014 | Fan | G06Q 30/0273 |
| | | | | 705/52 |
| 9,402,001 | B2* | 7/2016 | Shim | H04M 15/68 |
| 9,473,375 | B2* | 10/2016 | Sharma | H04L 43/0882 |
| 9,479,917 | B1* | 10/2016 | Gota | H04M 15/8235 |
| 9,686,415 | B2* | 6/2017 | Haslestad | H04M 15/10 |
| 10,027,819 | B2* | 7/2018 | Lu | G06Q 40/02 |
| 10,133,450 | B2* | 11/2018 | Meyer | H04W 48/00 |
| 10,296,881 | B2* | 5/2019 | Yan | G06Q 20/123 |
| 10,645,230 | B1* | 5/2020 | Tandon | H04W 76/12 |
| 2002/0180782 | A1* | 12/2002 | Natsuno | A63F 13/30 |
| | | | | 715/743 |
| 2003/0110272 | A1* | 6/2003 | du Castel | H04L 67/5682 |
| | | | | 709/217 |
| 2003/0115081 | A1* | 6/2003 | Ohtomo | G06Q 30/04 |
| | | | | 705/400 |
| 2003/0229549 | A1* | 12/2003 | Wolinsky | G06Q 30/0273 |
| | | | | 705/14.69 |
| 2005/0041679 | A1* | 2/2005 | Weinstein | H04N 7/17336 |
| | | | | 725/100 |
| 2007/0189514 | A1* | 8/2007 | Mehta | H04L 12/14 |
| | | | | 380/28 |
| 2009/0150210 | A1* | 6/2009 | Athsani | G06Q 30/0201 |
| | | | | 705/7.29 |
| 2009/0177650 | A1 | 7/2009 | Petersson et al. | |
| 2009/0192912 | A1* | 7/2009 | Griffin | G06Q 20/40 |
| | | | | 705/40 |
| 2010/0008484 | A1* | 1/2010 | Abrahamsson | H04M 15/775 |
| | | | | 379/121.03 |
| 2010/0192170 | A1* | 7/2010 | Raleigh | H04W 12/02 |
| | | | | 725/1 |
| 2011/0126249 | A1* | 5/2011 | Makhlouf | H04N 21/812 |
| | | | | 725/109 |
| 2012/0155380 | A1* | 6/2012 | Hodges | H04W 4/24 |
| | | | | 370/328 |
| 2013/0102276 | A1* | 4/2013 | Raj | H04M 15/09 |
| | | | | 455/406 |
| 2013/0166421 | A1* | 6/2013 | Gudmundsson | G06Q 30/04 |
| | | | | 707/769 |
| 2013/0316703 | A1* | 11/2013 | Girard | H04L 12/1432 |
| | | | | 705/26.1 |
| 2014/0094138 | A1* | 4/2014 | Saker | H04M 15/80 |
| | | | | 455/406 |
| 2014/0095690 | A1* | 4/2014 | Saker | H04L 65/1083 |
| | | | | 709/224 |
| 2014/0180929 | A1* | 6/2014 | Ohnishi | G06Q 20/38215 |
| | | | | 705/40 |
| 2014/0217164 | A1* | 8/2014 | Sweeney | G06Q 30/0601 |
| | | | | 235/375 |
| 2014/0370847 | A1* | 12/2014 | Neal | H04M 15/61 |
| | | | | 455/406 |
| 2015/0003298 | A1* | 1/2015 | Cai | H04M 15/67 |
| | | | | 370/259 |
| 2016/0066186 | A1* | 3/2016 | Kim | H04M 15/66 |
| | | | | 455/406 |
| 2016/0077693 | A1* | 3/2016 | Meyer | H04M 15/51 |
| | | | | 715/734 |
| 2016/0127565 | A1* | 5/2016 | Sharma | H04L 12/1403 |
| | | | | 455/406 |
| 2016/0330574 | A1* | 11/2016 | Wuts | H04W 76/15 |
| 2016/0373348 | A1* | 12/2016 | Renzullo | H04L 45/52 |
| 2017/0070617 | A1* | 3/2017 | Vasudevan | H04M 15/66 |
| 2017/0178193 | A1* | 6/2017 | Jagannath | G06Q 30/04 |
| 2017/0180960 | A1* | 6/2017 | Drake | H04W 24/02 |
| 2017/0272580 | A1* | 9/2017 | Cai | H04M 15/41 |
| 2018/0262354 | A1* | 9/2018 | Vuornos | H04L 12/1496 |
| 2019/0373424 | A1* | 12/2019 | Kappla | H04M 15/39 |
| 2022/0005016 | A1* | 1/2022 | Wu | G06Q 20/326 |

OTHER PUBLICATIONS

3GPP TS 23.501 V15.3.0, "3rd Generation Partnership Project; Technical Specification Group Services and System Aspects; System Architecture for the 5G System; Stage 2 (Release 15)," Sep. 2018, 226 pages.

3GPP TS 23.502 V15.3.0, "3rd Generation Partnership Project; Technical Specification Group Services and System Aspects; Procedures for the 5G System; Stage 2 (Release 15)," Sep. 2018, 330 pages.

3GPP TS 29.122 V16.0.0, "3rd Generation Partnership Project; Technical Specification Group Core Network and Terminals; T8 reference point for Northbound APIs; (Release 16)," Dec. 2018, 298 pages.

D'mello, "Mobile Video Industry Council says 90% of traffic on 5G will be mobile video," published online by VanillaPlus—The global voice for telecoms IT, https://www.vanillaplus.com/2018/10/26/42982-mobile-video-industry-council-says-90-traffic-5g-will-mobile-video/, Oct. 2018, 2 pages.

* cited by examiner

MANAGING A CHARGING OPERATION IN A COMMUNICATION NETWORK

CROSS REFERENCE TO RELATED APPLICATION

This application is a 35 U.S.C. § 371 national stage application of PCT International Application No. PCT/EP2019/064556 filed on Jun. 4, 2019, the disclosure and content of which is incorporated by reference herein in its entirety.

TECHNICAL FIELD

The present disclosure relates to a method for managing a charging operation in a communication network. The present disclosure also relates to a controller and to a computer program and a computer program product configured, when run on a computer to carry out a method for managing a charging operation in a communication network.

BACKGROUND

Fourth generation mobile communications networks offered improved mobility and connectivity over earlier version networks. The evolution to fifth generation networks will offer increased bandwidth and speed, among other advantages, and will be able to support highly data intensive services. With Over the Top (OTT) service providers experiencing ever increasing subscriber numbers, some estimates predict that up to 90% of traffic on 5G will be mobile video. The popularity of gaming and other interactive services is also driving a rise in demand for Augmented and Virtual Reality content. Such content can be in excess of 33 times more data intensive than 480p video, and the provision of such content over a mobile communication network thus presents particular challenges.

The current 5G system architecture, illustrated in FIG. 1, is presented in technical specification 3GPP TS 23.501 V15.3.0 (2018-09). Core network functions in the 5G architecture include the Network Slice Selection Function (NSSF) 102, Network Exposure Function (NEF) 104, Network Repository Function (NRF) 106, Policy Control Function (PCF) 108, Unified Data Management (UDM) 110, Application Function (AF) 112, Session Management Function (SMF) 114, User Plane Function (UPF) 116 and Charging Function (CHF).

Within the context of the 5G architecture and capabilities, businesses are continually seeking to innovate new ways to capture customer attention and deliver content to consumers. Collaboration between different business partners to deliver complex consumer products is widespread. Facilitating similar collaboration to deliver content over a communication network is an ongoing challenge.

SUMMARY

It is an aim of the present disclosure to provide a method, apparatus and computer readable medium which at least partially address one or more of the challenges discussed above.

According to a first aspect of the present disclosure, there is provided a method for managing a charging operation in a communication network. The method comprises receiving a content specification comprising an identification of at least two vendors, an identification of content for provision over the communication network, and a condition relating to charging the identified vendors for provision of the identified content to a User Equipment (UE). The method further comprises creating at least one charging policy for provision of content identified in the received content specification, the charging policy specifying division of charging for provision of the content to a UE between vendors identified in the content specification in accordance with the condition comprised in the content specification. The method further comprises receiving, from a UE, a request for provision of content over the network, retrieving a charging policy corresponding to the requested content, and creating a charging entry for provision of the requested content, the charging entry dividing charging for provision of the requested content between vendors identified in the retrieved charging policy and a subscriber account associated with the UE in accordance with the retrieved policy.

According to examples of the present disclosure, the identification of content may comprise identification of a website or application via which the content may be requested, or may comprise a content specific identification that distinguishes a particular piece of audio, video or other content, including for example Augmented Reality (AR) or Virtual Reality (VR) content. AR or VR content may be presented in the context of a game or other interactive offering, or may be presented in a different context. The content may in some cases be requested via a QR code or NFC tag. The content specification may comprise a single content identification or a plurality of content identifications. In examples in which the content specification comprises a plurality of content identifications, the condition or conditions relating to charging for the or each of the plurality of identified content may refer to the same, different or overlapping identified vendors. In some examples, the method may further comprise authorising charging for provision of the identified content to the identified vendors before creating the at least one charging policy.

Examples of the present disclosure thus provide a method enabling vendors to offer sponsored content, controlling how charging for the content is divided between one or more vendors and a user requesting the content. A final division of charging for content can be generated by a network operator, and can be provided to their parties and/or their application functions. Vendors may in turn use their applications to notify users of sponsored content. Examples of the present disclosure provide flexibility in allowing vendors to modify and update charging for particular content according to network or market conditions, and to tailor charging according to conditions including location based, time based, subscriber based etc.

According to examples of the present disclosure, the condition may comprise at least one of a geographical or temporal condition. According to examples of the present disclosure, a geographical condition may specify a geographical area within which a requesting UE must be located for charging of identified content to the identified vendors to be applied. A temporal condition may specify a time range within which a request for the content must be received for charging of the identified content to the identified vendors to be applied.

According to examples of the present disclosure, the condition may comprise a subscription condition relating to the subscriber account associated with a UE requesting the identified content.

According to examples of the present disclosure, a subscription condition may specify a particular Mobile Virtual Network Operator with which the subscriber must be associated, or a particular subscription level etc. for charging of identified content to the identified vendors to be applied.

According to examples of the present disclosure, the condition may comprise a threshold for charging of provision of identified content to an identified vendor.

According to examples of the present disclosure, the threshold may comprise at least one of an absolute threshold for a quantity of identified content, a relative threshold for a quantity of identified content, an absolute threshold for a cost of provision of identified content, a relative threshold for a cost of provision of identified content, and/or a threshold for cost of provision of all identified content which may be charged at least partially to a vendor.

According to examples of the present disclosure, the condition may comprise a plurality of thresholds for charging of provision of identified content to an identified vendor. According to examples of the present disclosure, the condition may specify ranges, for example charging of provision of between 10% and 20% of identified content. The condition may specify different ranges for different identified content for example 10% to 20% of content A and 15% to 30% of content B. According to examples of the present disclosure, a range of conditions may be comprised within the content specification, some of which may apply to different vendors and or to different identified content.

According to examples of the present disclosure, creating at least one charging policy for provision of content identified in the received content specification may comprises, for content identified in the content specification, creating a rule for division of charging for provision of the content between identified vendors for which a condition relating to charging the identified vendors for provision of the content to a UE is comprised in the content specification.

According to examples of the present disclosure, creating a rule may comprise creating a rule such that the condition is respected.

According to examples of the present disclosure, the rule may specify a charging ratio between the identified vendors.

According to examples of the present disclosure, the charging ratio may cover charging for provision of some or all of the content. The rule may specify that provision of any part of the content that is not covered by the ratio of charging between identified vendors should be charged to the subscriber account associated with the requesting UE.

According to examples of the present disclosure, receiving, from a UE, a request for provision of content over the network may comprise receiving, from the UE, an identification of an offering for content provision, the offering comprising at least one of content identification, vendor identification and/or a charging ratio for charging provision of the identified content between the identified vendor or vendors.

According to examples of the present disclosure, the offering may be accessible to a UE via a platform comprising at least one of a Quick Response (QR) code and/or a Near Field Communication (NFC) tag.

According to examples of the present disclosure, the offering may be configured in the QR code or NFC tag by one or more of the vendors identified in the offering.

According to examples of the present disclosure, the identified offering received from the UE may comprise a charging ratio for charging provision of the identified content between the identified vendor or vendors. According to such examples, the method may further comprise verifying that the charging ratio in the offering is consistent with the retrieved charging policy for the identified content.

According to examples of the present disclosure, retrieving a charging policy corresponding to the requested content may comprise retrieving a plurality of charging policies relating to the requested content, and creating a charging entry for provision of the requested content may comprise generating an updated division of charging for provision of the content to a UE between vendors identified in the plurality of retrieved charging policies, and creating a charging entry dividing charging for provision of the requested content between vendors identified in the retrieved charging policies and a subscriber account associated with the UE in accordance with the updated division.

According to examples of the present disclosure, creation of a charging entry for provision of the requested content may be triggered by detection of traffic matching the retrieved charging policy.

According to examples of the present disclosure, creating a charging entry may further comprise confirming that the UE fulfils any condition included in the retrieved charging policy and based on a condition included in the content specification. For example the method may comprise checking a time of day, geographic location or subscription level of the UE to confirm compliance with a condition.

According to examples of the present disclosure, the content specification may comprise a multivendor content specification, the multivendor content specification identifying a plurality of vendors in connection with identified content, and comprising a condition relating to charging the plurality of identified vendors for provision of the identified content to a UE.

According to examples of the present disclosure, the multivendor content specification may be received from any one or more of the vendors identified in the multivendor content specification.

According to examples of the present disclosure, the content specification may comprise a plurality of single vendor content specifications, each single vendor content specification identifying a vendor in connection with identified content, and comprising a condition relating to charging the identified vendor for provision of the identified content to a UE.

According to examples of the present disclosure, receiving a content specification may comprise receiving a plurality of single vendor content specifications from a plurality of vendors.

According to examples of the present disclosure, creating at least one charging policy for provision of content identified in the received content specification may comprise, for content identified in the content specification, retrieving received single vendor content specifications that identify the content, and creating a rule for division of charging for provision of the content to a UE between vendors identified in the retrieved single vendor content specifications in accordance with the conditions comprised in the retrieved single vendor content specifications.

According to examples of the present disclosure, the method may further comprise informing vendors appearing in the charging entry of the division of charging for provision of the requested content between the vendors. According to examples of the present disclosure, this information may in turn be provided by the vendors to the UE, and/or the method may comprise informing the UE of the division of charging between vendors for provision of the requested content.

According to examples of the present disclosure, the method may be carried out by network functions in a 5G network, which functions may include a Network Exposure Function (NEF), Policy Control Function (PCF), Session Management Function (SMF), User Plane Function (UPF) and Charging Function (CHF). The content specification may be received from one or more vendors via one or more Application Functions (AFs) associated with the one or more vendors.

According to another aspect of the present disclosure, there is provided a method for providing content to a User Equipment (UE). The method comprises assembling an offering for content provision, the offering comprising at least one of content identification, vendor identification and/or a charging ratio for charging provision of the identified content between the identified vendor or vendors. The method further comprises encoding information about the offering for content provision onto a platform accessible to a UE. According to examples of the present disclosure, the platform may comprise at least one of a Quick Response, QR, code, and/or a Near Field Communication, NFC, tag. According to examples of the present disclosure, the method may further comprise receiving a request from a UE for content, the request identifying the offering for content provision, and sending the content identified in the offering for content provision to the UE.

According to another aspect of the present disclosure, there is provided a computer program comprising instructions which, when executed on at least one processor, cause the at least one processor to carry out a method according to any one of the preceding aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure. According to another aspect of the present disclosure, there is provided a controller for managing a charging operation in a communication network. The controller comprises a processor and a memory, the memory containing instructions executable by the processor such that the controller is operable to receive a content specification comprising an identification of at least two vendors, an identification of content for provision over the communication network, and a condition relating to charging the identified vendors for provision of the identified content to a User Equipment (UE). The controller is further operable to create at least one charging policy for provision of content identified in the received content specification, the charging policy specifying division of charging for provision of the content to a UE between vendors identified in the content specification in accordance with the condition comprised in the content specification. The controller is further operable to receive, from a UE, a request for provision of content over the network, retrieve a charging policy corresponding to the requested content, and create a charging entry for provision of the requested content, the charging entry dividing charging for provision of the requested content between vendors identified in the retrieved charging policy and a subscriber account associated with the UE in accordance with the retrieved policy.

According to examples of the present disclosure, the controller may be further operable to carry out a method according to any one of the preceding aspects or examples of the present disclosure.

According to another aspect of the present disclosure, there is provided a controller for managing a charging operation in a communication network. The controller is adapted to receive a content specification comprising an identification of at least two vendors, an identification of content for provision over the communication network, and a condition relating to charging the identified vendors for provision of the identified content to a User Equipment (UE). The controller is further adapted to create at least one charging policy for provision of content identified in the received content specification, the charging policy specifying division of charging for provision of the content to a UE between vendors identified in the content specification in accordance with the condition comprised in the content specification. The controller is further operable to receive, from a UE, a request for provision of content over the network, retrieve a charging policy corresponding to the requested content, and create a charging entry for provision of the requested content, the charging entry dividing charging for provision of the requested content between vendors identified in the retrieved charging policy and a subscriber account associated with the UE in accordance with the retrieved policy.

According to examples of the present disclosure, the controller may be further adapted to carry out a method according to any one of the preceding aspects or examples of the present disclosure.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Technical specification 3GPP TS 23.502 V15.3.0 (2018-09) allows for the possibility within a 5G network of introducing an additional charging party within a session. Aspects of the present disclosure propose methods according to which charging for delivery of content may be split between different vendors. Intelligence regarding the nature of the content, identification of the vendors and conditions for the division of charging for the content between the vendors may be included in a content specification provided to the network. In this manner, content may be "sponsored" by more than one vendor for delivery to a user. The cost of delivery of particular content to a user may be shared exclusively between vendors, or may be shared between vendors and the subscriber seeking to access the content. Examples of the present disclosure propose a new service: "Nnef_SplitChargingRatio" to facilitate the dissemination to appropriate network functions of information regarding how charging for a particular piece of content may be divided between vendors and a subscriber.

Figure 1:
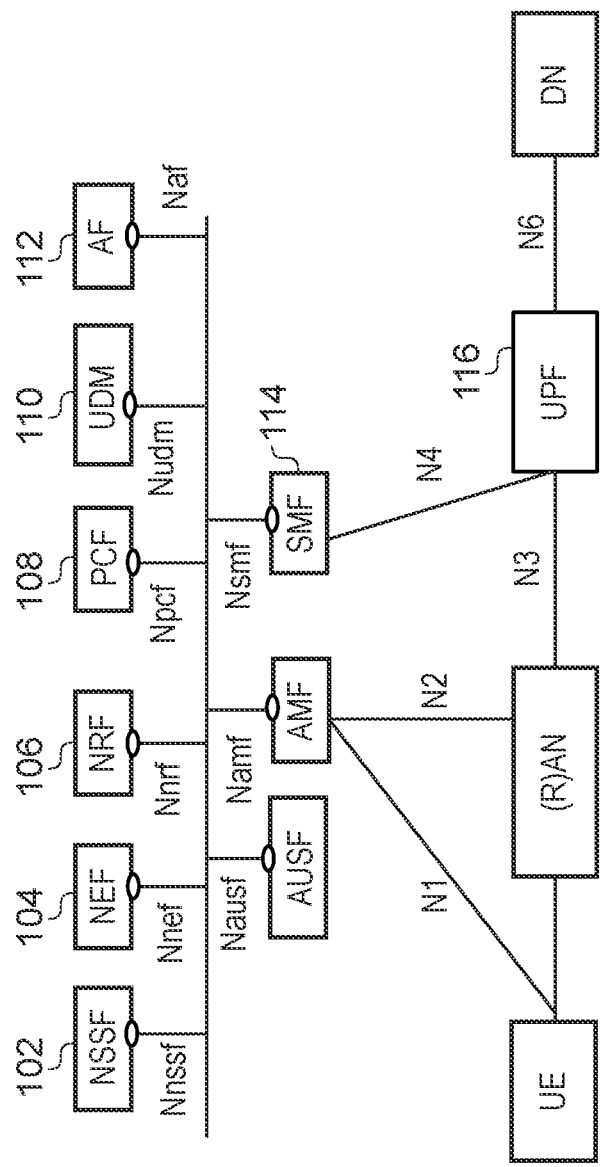
FIG. 1 illustrates a 5G system architecture.
Figure 2:
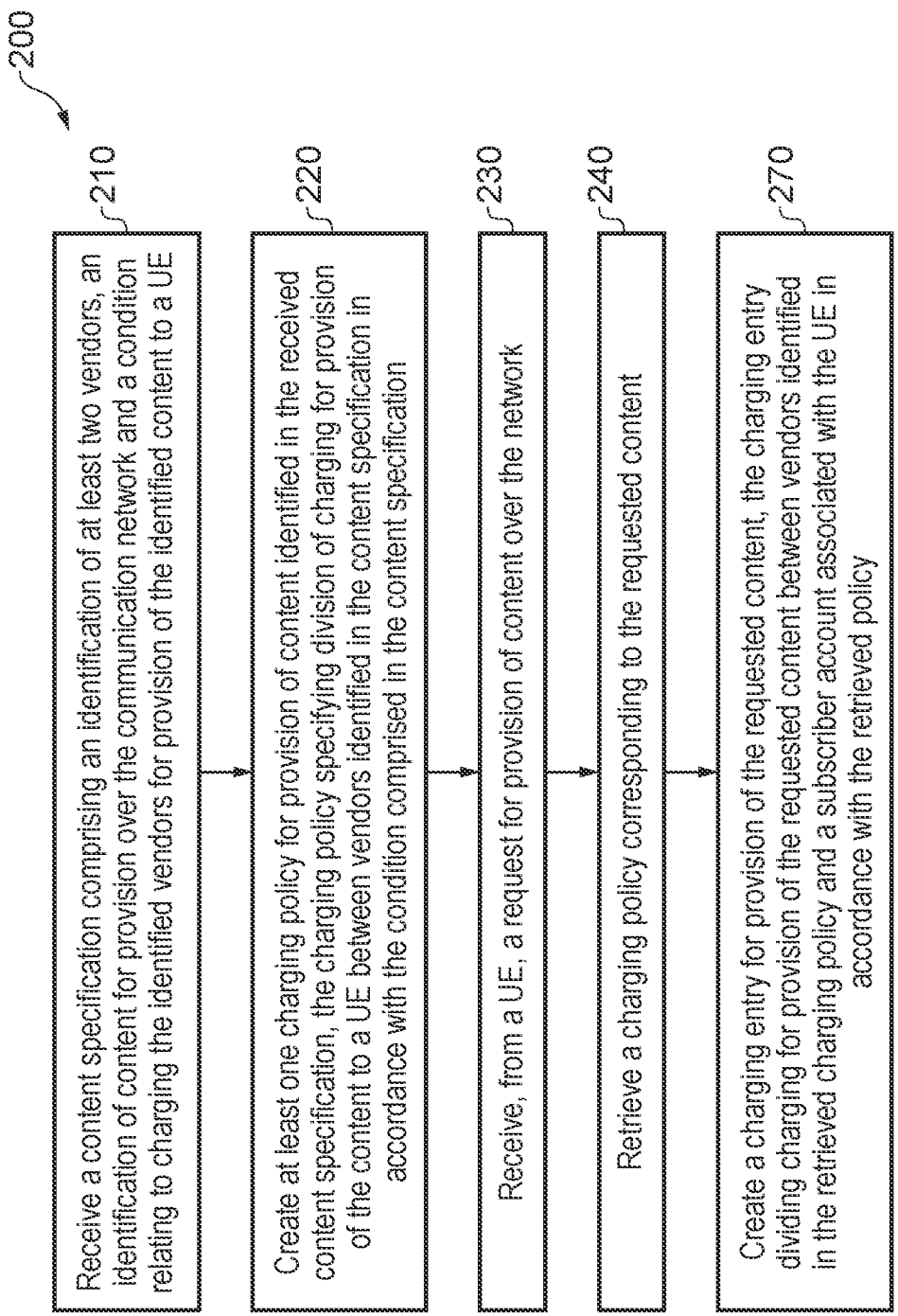
FIG. 2 is a flow chart illustrating process steps in a method for managing a charging operation in a communication network.

FIG. 2 is a flow chart illustrating process steps in a method 200 for managing a charging operation in a communication network. Referring to FIG. 2, in a first step 210, the method 200 comprises receiving a content specification. The content specification comprises an identification of at least two vendors, an identification of content for provision over the communication network, and a condition relating to charging the identified vendors for provision of the identified content to a UE. In some examples, as discussed in further detail below with reference to FIGS. 3a and 3b, the content specification may comprise a multivendor content specification. A multivendor content specification identifies a plurality of vendors in connection with identified content, and comprises a condition relating to charging the plurality of identified vendors for provision of the identified content to a UE. In other examples, also discussed below, the content specification may comprise a plurality of single vendor content specifications, each single vendor content specification identifying a vendor in connection with identified content, and comprising a condition relating to charging the identified vendor for provision of the identified content to a UE.

In step 220, the method 200 comprises creating at least one charging policy for provision of content identified in the received content specification, the charging policy specifying division of charging for provision of the content to a UE between vendors identified in the content specification in accordance with the condition or conditions comprised in the content specification.

The method 200 further comprises, in step 230, receiving from a UE a request for provision of content over the network, and, in step 240, retrieving a charging policy corresponding to the requested content. The method 200 then comprises, in step 270, creating a charging entry for provision of the requested content, the charging entry dividing charging for provision of the requested content between vendors identified in the retrieved charging policy and a subscriber account associated with the UE in accordance with the retrieved policy.

The method 200 may be carried out by network functions in a 5G network, which functions may include a Network Exposure Function (NEF), Policy Control Function (PCF), Session Management Function (SMF), User Plane Function (UPF) and Charging Function (CHF). The content specification may be received from one or more vendors via one or more Application Functions (AFs) associated with the one or more vendors. The identification of content may comprise identification of a website or application via which the content may be requested or may comprise a content specific identification that distinguishes a particular piece of audio, video or other content, including for example AR or VR content. The content may in some cases be requested via a QR code or NFC tag. The content specification may comprise a single content identification or a plurality of content identifications, in which examples, the condition or conditions relating to charging for the each of the plurality of identified content may refer to the same, different or overlapping identified vendors. In some examples, the method may further comprise authorising charging for provision of the identified content to the identified vendors before creating the at least one charging policy.

Examples of the method 200 may be used to facilitate split charging for provision of content in a wide range of use cases. A full discussion of such use cases is provided at the end of this disclosure. Illustrative examples of such use cases are discussed briefly below.

In a retail environment, short term offers, promotions, or promotional material may be communicated to customers. A content provision offering, according to which provision of certain content concerning products or services offered in the environment is proposed, may be encoded into a QR code, NFC tag or other communication platform. A user scanning the code or tag may access the offered content at a reduced rate, with charging for provision of the content shared between vendors and the user. Examples of content may include promotional materials for a consumer product, promotional gaming content for particular interactive games offered in the retail environment, etc. With multiple vendors frequently collaborating to produce a single final product, charging for provision of promotional content for the product may be shared between such vendors, or between vendors and an owner of the retail environment.

On public transport, content regarding short term offers or promotions may be provided to customers via a similar QR code or NFC tag, with charging for provision of the content shared, for example between an organisation running the transport, attractions at promoted destinations, etc.

Product documentation, including assembly and usage instructions, may be digitised in the form of high quality video guides. Provision of such content over a communication network may be sponsored by one or more product manufacturers, and such content may be accessed by a customer via a platform such as a QR code or NFC tag as discussed above.

Figure 3A:
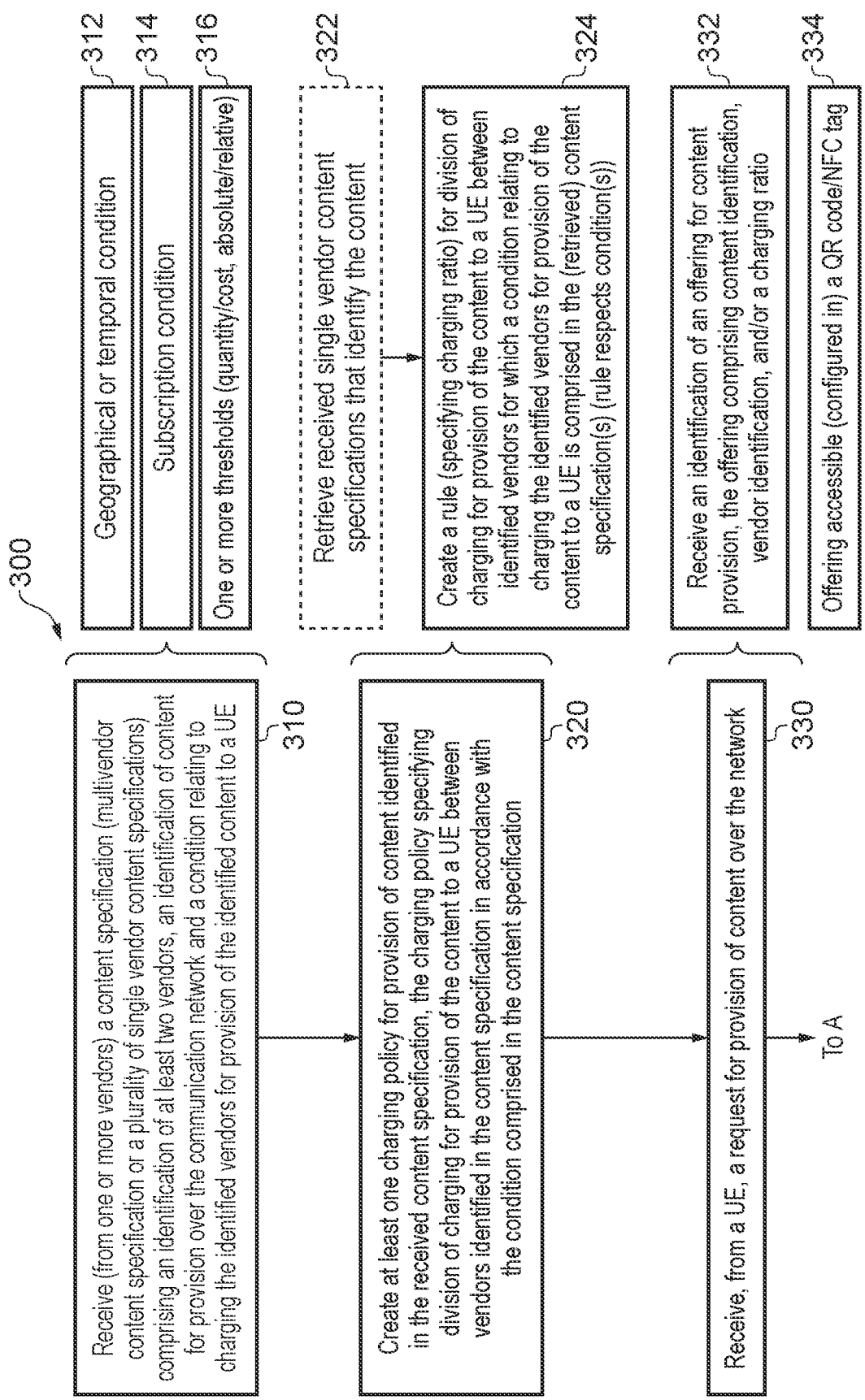
FIGS. 3a and 3b show a flow chart illustrating process steps in another example of a method for managing a charging operation in a communication network.
Figure 3B:
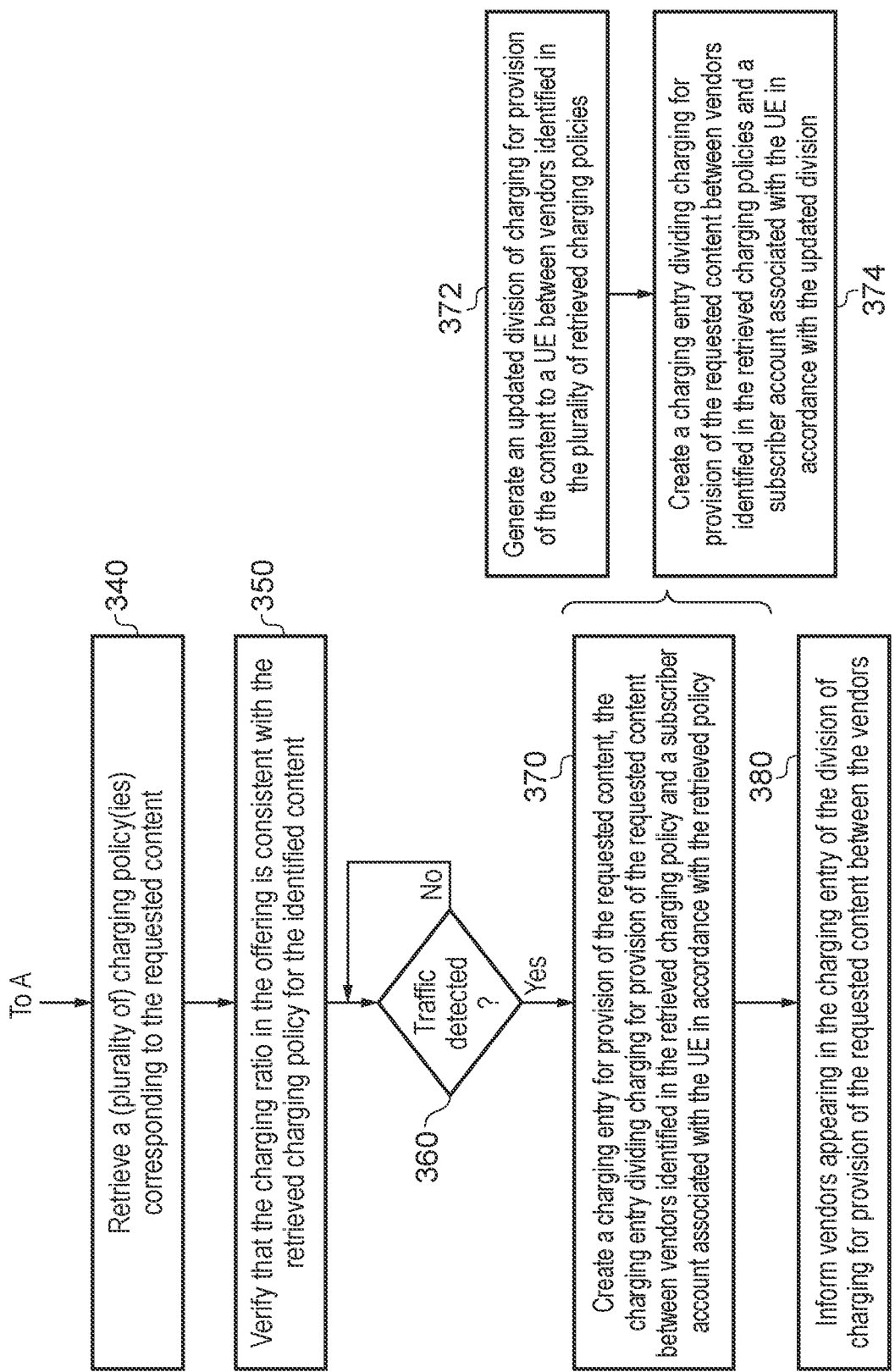

FIGS. 3a and 3b show a flow chart illustrating process steps in another example of a method 300 for managing a charging operation in a communication network. The steps of the method 300 illustrate one way in which the steps of the method 200 may be implemented and supplemented in order to achieve the above discussed and additional functionality. As for the method 200 of FIG. 2 above, the method 300 may be carried out by network functions in a 5G network, which functions may include a Network Exposure Function (NEF), Policy Control Function (PCF), Session Management Function (SMF), User Plane Function (UPF) and Charging Function (CHF).

Referring initially to FIG. 3a, in a first step 310, the method 300 comprises receiving a content specification. The content specification comprises an identification of at least two vendors, an identification of content for provision over the communication network, and a condition relating to charging the identified vendors for provision of the identified content to a UE.

As discussed above, the identification of content may comprise identification of a website or application via which the content may be requested, or may comprise a content specific identification that distinguishes a particular piece of audio, video or other content, including for example Augmented Reality (AR) or Virtual Reality (VR) content. AR or VR content may be presented in the context of a game or other interactive offering, or may be presented in a different context.

The content specification may comprise a single content identification or a plurality of content identifications. In examples in which the content specification comprises a plurality of content identifications, the condition or conditions relating to charging for the or each of the plurality of identified content may refer to the same, different or overlapping identified vendors.

In some examples, the content specification may comprise a plurality of single vendor content specifications, each single vendor content specification identifying a vendor in connection with identified content, and comprising a condition relating to charging the identified vendor for provision of the identified content to a UE. In such examples, receiving a content specification may comprise receiving a plurality of single vendor content specifications from a plurality of vendors. In other examples, the content specification may comprise a multivendor content specification, the multivendor content specification identifying a plurality of vendors in connection with identified content, and comprising a condition relating to charging the plurality of identified vendors for provision of the identified content to a UE. The multivendor content specification may be received from any one or more of the vendors identified therein.

As illustrated at step 312, the condition relating to charging the identified vendors for provision of the content may comprise at least one of a geographical or temporal condition. A geographical condition may specify a geographical area within which a requesting UE must be located for charging of identified content to the identified vendors to be applied. A temporal condition may specify a time range within which a request for the content must be received for charging of the identified content to the identified vendors to be applied.

As illustrated at step 314, the condition relating to charging the identified vendors for provision of the content may alternatively or additionally comprise a subscription condition relating to the subscriber account associated with a UE requesting the identified content. The subscription condition may specify a particular Mobile Virtual Network Operator with which the subscriber must be associated, or a particular subscription level etc. for charging of identified content to the identified vendors to be applied.

As illustrated at step 316, the condition relating to charging the identified vendors for provision of the content may alternatively or additionally comprise a threshold for charging of provision of identified content to an identified vendor. The threshold may comprise any one or more of: an absolute threshold for a quantity of identified content; a relative threshold for a quantity of identified content (for example with respect to the total size of the content), an absolute threshold for a cost of provision of identified content, a relative threshold for a cost of provision of identified content (for example with respect to the total cost of provision of the content for the particular subscriber), and/or a threshold for cost of provision of all identified content which may be charged at least partially to a vendor.

In some examples, the condition may comprise a plurality of thresholds for charging of provision of identified content to an identified vendor. The plurality of thresholds may specify ranges, such as for example charging of provision of between 10% and 20% of identified content. The condition may specify different ranges for different identified content for example 10% to 20% of content A and 15% to 30% of content B. A range of conditions may be comprised within the content specification, some of which may apply to different vendors and or to different identified content. In examples in which a multivendor content specification is received, the condition may comprise a ratio for charging for provision of the content between identified vendors.

In step 320, the method 300 comprises creating at least one charging policy for provision of content identified in the received content specification, the charging policy specifying division of charging for provision of the content to a UE between vendors identified in the content specification in accordance with the condition or conditions comprised in the content specification.

In examples in which more than one single or multivendor content specifications are received, this step may initially comprise retrieving all received content specifications in which a particular content is identified at step 322. For example, multiple vendors may wish to sponsor (by paying at least partially for) the provision of content from a particular website. Creating at least one charging policy for delivery of content from this website may first comprise retrieving all content specifications in which the website is identified.

Creating at least one charging policy for provision of content identified in the received content specification further comprises, at step 324, for content identified in the content specification, creating a rule for division of charging for provision of the content between identified vendors for which a condition relating to charging the identified vendors for provision of the content to a UE is comprised in the content specification. The rule may be such that the condition or conditions is/are respected, and may specify a charging ratio between the identified vendors. If multiple content specifications identify the same content, the rule may specify division of charging for provision of the content to a UE between vendors identified in the retrieved content specifications in accordance with the conditions comprised in the retrieved single vendor content specifications. Thus for example, if one single-vendor content specification includes the condition of sponsoring up to a percentage X of the content, and another single vendor content specification includes the condition of sponsoring up to a percentage Y of the content, step 324 may comprise creating a ration for changing of content between the relevant vendors that respects the percentages X and Y. In other examples, if a multivendor content specification includes as a condition a charging ratio for charging provision of identified content between identified vendors, the step of creating a charging policy may comprise writing the ratio included in the content specification as a rule for the charging policy.

A charging ratio may cover charging for provision of some or all of the content. The created rule may specify that provision of any part of the content that is not covered by the ratio of charging between identified vendors should be charged to the subscriber account associated with the requesting UE.

Any other conditions included in one or more received content specifications may also be written into the charging policy, including for example geographical, temporal; or subscriber account related requirements for the division of charging between vendors to be applied.

Referring still to FIG. 3a, in step 330, the method 300 comprises receiving, from a UE, a request for provision of content over the network. This may comprise, at step 332, receiving from the UE an identification of an offering for content provision, the offering comprising at least one of content identification, vendor identification, and/or a charging ratio for charging provision of the identified content between the identified vendor or vendors. As illustrated at step 334, the offering may be accessible to a UE via a platform comprising at least one of QR code and/or an NFC tag. The offering may be configured in the QR code or NFC tag by one or more of the vendors identified in the offering. A UE may request the content identified in the offering by scanning the QR code or NFC tag.

Referring now to FIG. 3b, the method 300 further comprises retrieving a charging policy corresponding to the content requested in step 330. In some examples, a plurality of charging policies may correspond to the requested content, in which case some or all of the charging policies may be retrieved.

If the identified offering received from the UE comprises a charging ratio for charging provision of the identified content between the identified vendor or vendors, the method further comprises, at step 340, verifying that the charging ratio in the offering is consistent with the retrieved charging policy or policies for the identified content.

In step 360, the method 300 checks for detection of traffic matching the retrieved charging policy, indicating that the requested content is being delivered. If the requested content is delivered, the method 300 then comprises creating a charging entry for provision of the requested content in step 370, the charging entry dividing charging for provision of the requested content between vendors identified in the retrieved charging policy and a subscriber account associated with the UE in accordance with the retrieved policy, and in accordance with any information specified in the offering identified in the request for content received from the UE. Creating a charging entry may comprise confirming that the UE fulfils any condition included in the retrieved charging policy and based on a condition included in the content specification. For example the method may comprise checking a time of day, geographic location or subscription level of the UE to confirm compliance with a condition.

If the step 340 of retrieving a charging policy corresponding to the requested content comprised retrieving a plurality of charging policies relating to the requested content, the step 370 of creating a charging entry may comprise generating an updated division of charging for provision of the content to a UE between vendors identified in the plurality of retrieved charging policies in step 372. Step 370 may further comprise, in step 374, creating a charging entry dividing charging for provision of the requested content between vendors identified in the retrieved charging policies and a subscriber account associated with the UE in accordance with the updated division.

The method 300 then comprises, in step 380, informing vendors appearing in the charging entry of the division of charging for provision of the requested content between the vendors. This information may in turn be provided by the vendors to the UE, and/or the method may comprise informing the UE of the division of charging between vendors for provision of the requested content.

As discussed above, the method may be carried out by network functions in a 5G network, which functions may include a Network Exposure Function (NEF), Policy Control Function (PCF), Session Management Function (SMF), User Plane Function (UPF) and Charging Function (CHF). The content specification may be received from one or more vendors via one or more Application Functions (AFs) associated with the one or more vendors.

Aspects of the present disclosure provide a controller which is adapted to perform any or all of the steps set out above in method 200 and/or 300. The controller may be implemented between the above identified functions.

Figure 4:
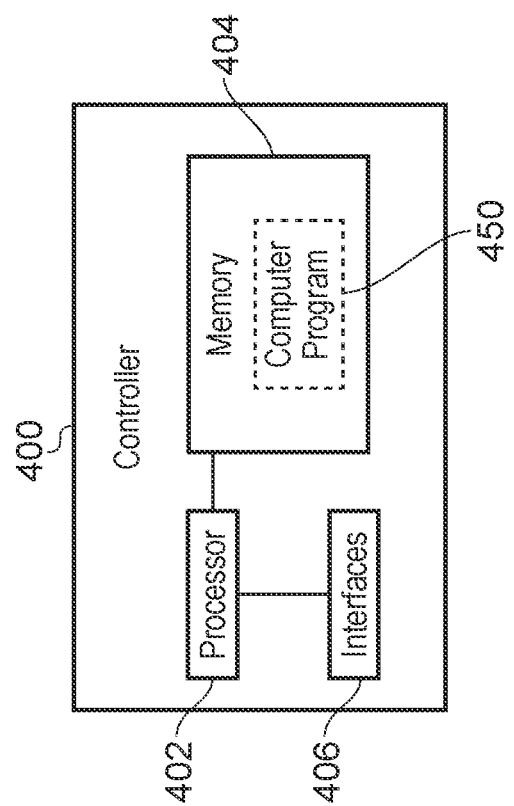
FIG. 4 is a block diagram illustrating functional modules in a controller.

FIG. 4 is a block diagram illustrating an example controller 400 which may implement the method 200 and/or 300 according to examples of the present disclosure, for example on receipt of suitable instructions from a computer program 450. Referring to FIG. 4, the controller 400 comprises a processor or processing circuitry 402, and may comprise a memory 404 and interfaces 406. The processing circuitry 402 is operable to perform some or all of the steps of the method 200 and/or 300 as discussed above with reference to FIGS. 2, 3a and 3b. The memory 404 may contain instructions executable by the processing circuitry 402 such that the controller 400 is operable to perform some or all of the steps of the method 200 and/or 300. The instructions may also include instructions for executing one or more telecommunications and/or data communications protocols. The instructions may be stored in the form of the computer program 450. In some examples, the processor or processing circuitry 402 may include one or more microprocessors or microcontrollers, as well as other digital hardware, which may include digital signal processors (DSPs), special-purpose digital logic, etc. The processor or processing circuitry 402 may be implemented by any type of integrated circuit, such as an Application Specific Integrated Circuit (ASIC), Field Programmable Gate Array (FPGA) etc. The memory 404 may include one or several types of memory suitable for the processor, such as read-only memory (ROM), random-access memory, cache memory, flash memory devices, optical storage devices, solid state disk, hard disk drive etc.

Figure 5:
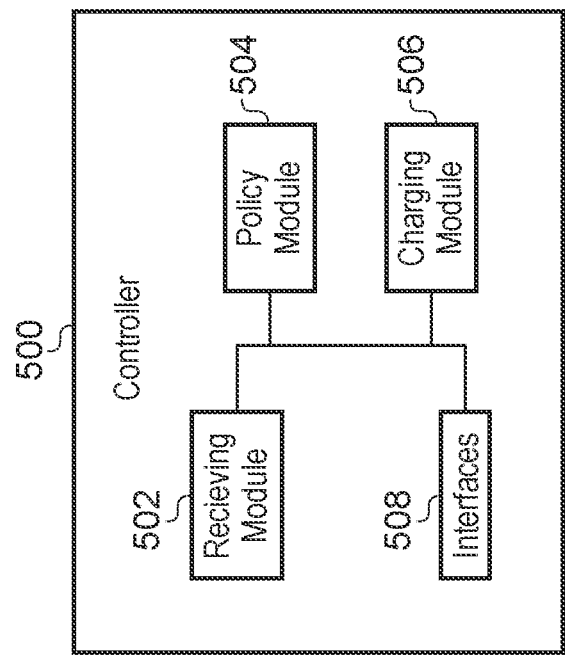
FIG. 5 is a block diagram illustrating functional modules in another example of controller.

FIG. 5 illustrates functional modules in another example of controller 500 which may execute examples of the methods 200 and/or 300 of the present disclosure, for example according to computer readable instructions received from a computer program. It will be understood that the modules illustrated in FIG. 5 are functional modules, and may be realised in any appropriate combination of hardware and/or software. The modules may comprise one or more processors and may be integrated to any degree.

Referring to FIG. 5, the controller 500 comprises a receiving module 502 for receiving a content specification comprising an identification of at least two vendors, an identification of content for provision over the communication network, and a condition relating to charging the identified vendors for provision of the identified content to a UE. The receiving module 502 is also for receiving from a UE a request for provision of content over the network. The controller 500 also comprises a policy module 504 for creating at least one charging policy for provision of content identified in the received content specification, the charging policy specifying division of charging for provision of the content to a UE between vendors identified in the content specification in accordance with the condition comprised in the content specification. The policy module 504 is also for retrieving a charging policy corresponding to the requested content. The controller 500 further comprises a charging module 506 for creating a charging entry for provision of the requested content, the charging entry dividing charging for provision of the requested content between vendors identified in the retrieved charging policy and a subscriber account associated with the UE in accordance with the retrieved policy. The controller 500 may also comprise interfaces 508.

In some examples of the present disclosure, there is also proposed a method for providing content to a User Equipment (UE). The method may be performed by one or more vendors, and comprises assembling an offering for content provision, the offering comprising at least one of content identification, vendor identification and/or a charging ratio for charging provision of the identified content between the identified vendor or vendors. The method further comprises encoding information about the offering for content provision onto a platform accessible to a UE. According to examples of the present disclosure, the platform may comprise at least one of a Quick Response, QR, code, and/or a Near Field Communication, NFC, tag. According to examples of the present disclosure, the method may further comprise receiving a request from a UE for content, the request identifying the offering for content provision, and sending the content identified in the offering for content provision to the UE.

Examples of the present disclosure may be implemented via a new service. The present disclosure envisages options according to which multiple vendors may cooperate to propose a split charging offering of content, or multiple vendors may independently propose to be charged for provision of a certain part of identified content, and a definitive split charging ratio may be established by the network. Implementation of methods of the present disclosure according to each of these options is discussed in greater detail below.

Figure 6:
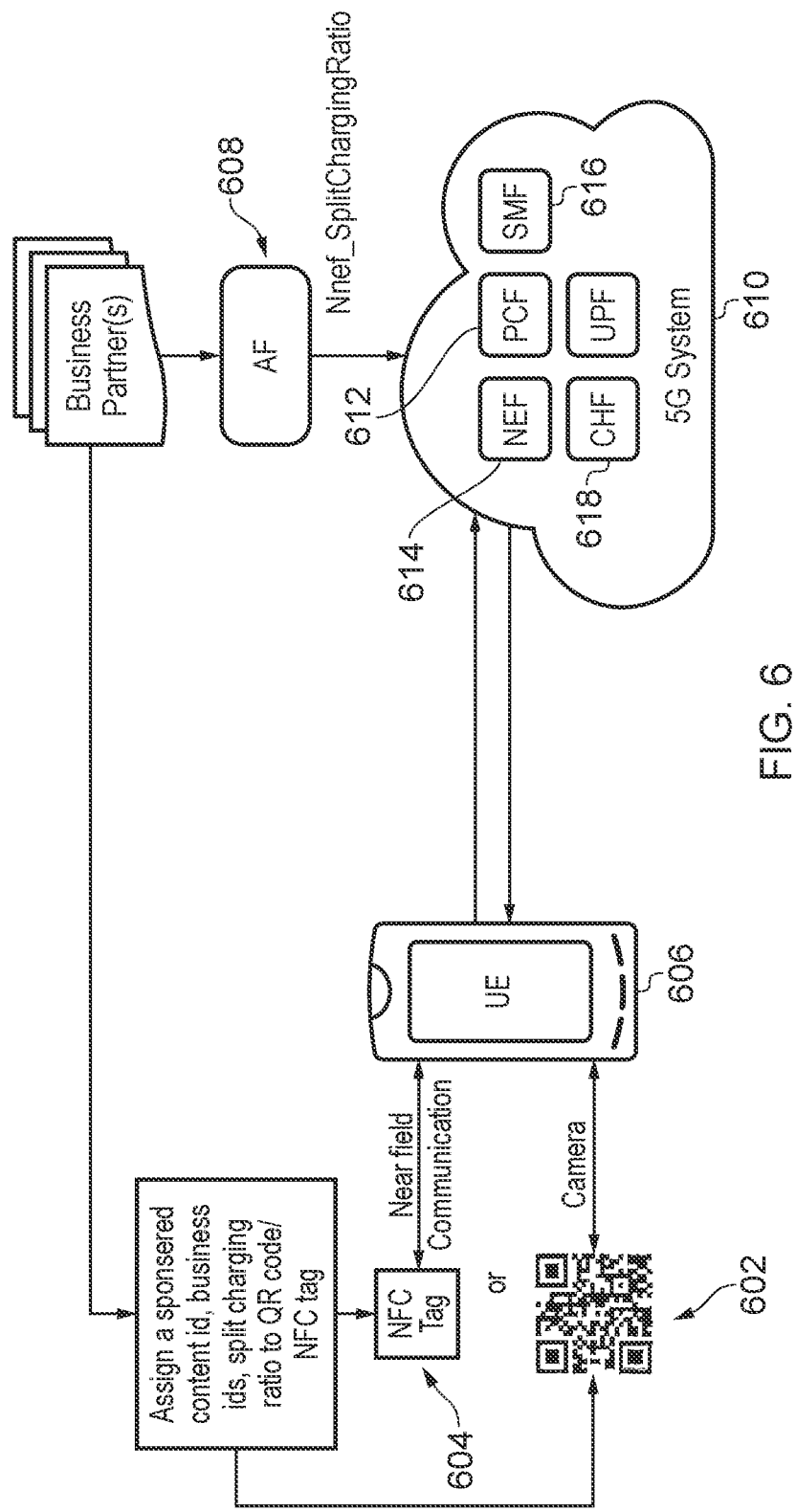
FIG. 6 is a block diagram illustrating implementation of the methods of FIGS. 2 and/or 3a and 3b.

Option 1 envisages multiple vendors cooperating to propose shared charging for provision of content. This corresponds to receipt at the network of a multivendor content specification. FIG. 6 is a block diagram illustrating implementation of the method 200 and/or 300 according to this option.

Referring to FIG. 6, a QR code 602 or NFC tag 604 is configured with the following structure:
 (i) One or more sponsored content ID(s), such as for example OTT application IDs,
 (ii) One or more vendor ID(s) such as sponsors, brands, or other businesses, in accordance with agreement between the vendors, and
 (iii) In some examples, a split charging ratio for splitting the cost of delivering the sponsored content to a subscriber UE between the one or more vendors in accordance with agreement between the vendors and a network service provider.

A Split Charging Ratio (SCR) between vendors may be in the format: {business 1: business 2: . . . business N}

Example: business A=10%, business B=20%, business C=20%,
 SCR=10:20:20=1:2:2

Referring still to FIG. 6, a user scans the QR code 602 using a camera enabled UE 606 or sets up near field communication between the NFC tag 604 and an NFC enabled UE 606. The information encoded in the QR code or NFC tag and discussed above is transferred to the UE 606.

The UE 606 authenticates itself and the offering encoded in the QR code or NFC tag to a corresponding Application Function (AF) 608, via a communication network 610 and using the QR code/NFC tag. Vendors (illustrated as "business partners"), have already provisioned a split charging ratio as part of a content specification at a PCF 612 of the communication network using their AFs 608 and NEF 614 using steps i-v discussed below and illustrated in FIG. 7.

Figure 7:
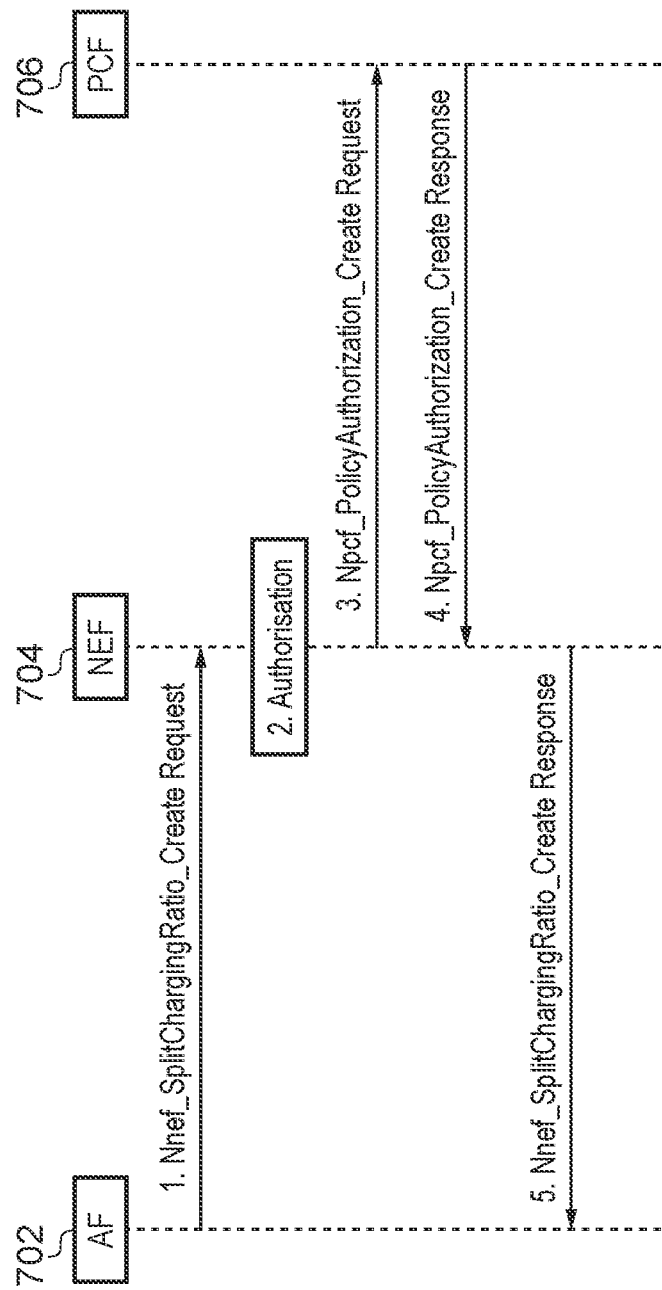
FIG. 7 illustrates message flow for the provision of a content specification

FIG. 7 illustrates message flow for the provision of a content specification including charging information such as a split charging ration to the network. Messages are exchanged between an Application Function (AF) 702 of one of the vendors identified in the content specification, a Network Exposure Function (NEF) 704 and a Policy Control Function (PCF) 706.

Referring to FIG. 7, the following steps may be performed:
 i. For an ongoing AF session, the AF 702 may send a new parameter Nnef_SplitChargingRatio_Create request message to the NEF 704.
 ii. The NEF 704 authorizes the AF request to sponsor identified content traffic between a UE and the network according to a split charging ratio between different vendors/business partners and a subscriber.
 iii. The NEF 704 interacts is with the PCF 706 to send a Npcf_PolicyAuthorization_Create request.
 iv. The PCF 706 determines whether or not the request is authorised and applies the split charging ratio expression included in the received message details (Nnef_SplitChargingRatio_Create) and sends a Npcf_PolicyAuthorization_Create response message.
 v. The NEF 704 sends a Nnef_SplitChargingRatio_Create response message to the AF 702.

Referring again to FIG. 6, following authentication of the UE with the AF 608, the AF 608 interacts with the NEF 614 using the new service (for example setting a percentage of the content, particular service and times etc. applying to charging of provision of content by the vendor associated with the A 608). An identification of the particular vendor would be connected the specific AF 608.

The NEF 614 then checks if there are any additional sponsors for the same UE and content/service. If additional sponsors exist (vendors seeking to be charged for the provision of the content) the NEF 614 generates a specific division of charging for the content between all identified sponsors according to their individual requirements and conditions for sponsorship of the content.

The NEF 614 then interacts with the PCF 612 and requests specific policies to be installed for the UE (using the identified content, percentage split for charging and sponsor identifications). The PCF 612 stores the request, and either updates an SMF 616 (if there is already an ongoing subscription from an SMF) or it waits for a new subscription from an SMF. When traffic that matches the policy is detected in the SMF 616, the SMF 616 triggers a request to a CHF 618 including the sponsor identifications and the percentages of content for which that are to be charged. The CHF 618 then generates records for the sponsor(s) and deducts charging for any remaining percentage of the content provision from a subscriber account associated with the requesting UE.

Message contents for the proposed new message Nnef_SplitChargingRatio are presented below:

| Message name | Message Contents |
| --- | --- |
| Nnef_SplitChargingRatio | AF Identifier<br>Split Charging Ratio Status (Yes/No)<br>One or more sponsor and subscriber negotiated Split Charging Ratio expressions<br>Split Charging Ratio Expression = {[business 1]:[business 2]: . . . [business N]:Subscriber} |

-continued

| Message name | Message Contents |
|---|---|
| | [business x] = regular expression for range (min, max) of business share<br>An incoming ratio between business partners from a QR code may be evaluated against the Split Charging Ratio Expression and a final ratio between business partners and subscribers may be generated following the evaluation. Exact subscriber share of payment for content is then determined<br>Example:<br>Split Charging Ratio expression between business partners A, B, C, and subscriber =<br>{business A = 10% to 20%:business B = 20% to 30%:business C = 10% to 30%:Subscriber = 100 − (A + B + C)}<br>In accordance with an incoming ratio from a scanned QR code, values are validated and a final Split Charging Ratio is generated:<br>Business A = 10%,<br>Business B = 20%,<br>Business C = 20%,<br>Subscriber = 100 − (10 + 20 + 20) = 50%<br>Final Split Charging Ratio (business partners, subscriber) is generated = 10:20:20:50 = 1:2:2:5<br>One or more identities of content sponsors including in the Split Charging Ratio<br>Incoming Split Charging Ratio from UE (optional)<br>Sponsor content identification according to OTT app identification<br>Other criteria for split charging ratio<br>source, destination (for example in a transport or other mobile use case)<br>time period or limit,<br>number of unique products (unique QR codes scanned) that subscriber has considered within a single environment or time period. For example, a vendor may increase its share of charging for particular content by an additional x % (within the split charging ratio a:b:c of sponsored content to be delivered on UE) if a subscriber UE has considered y or more products associated with that vendor.<br>Additional share x % of a business partner (optional) |

Figure 8:
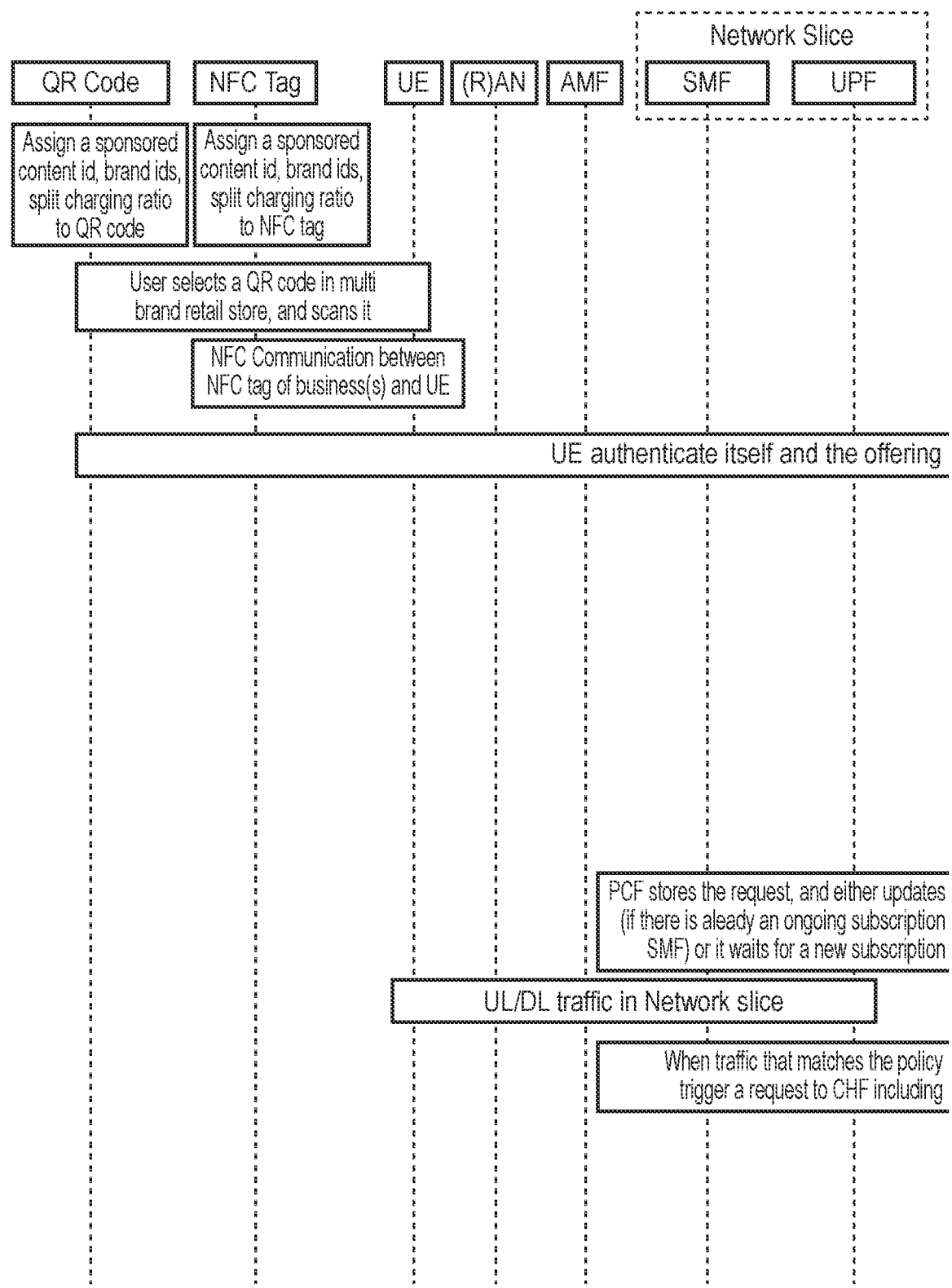
FIG. 8 illustrates end to end message flow according to an implementation of the methods of FIGS. 2 and/or 3a and 3b.
Figure 8:
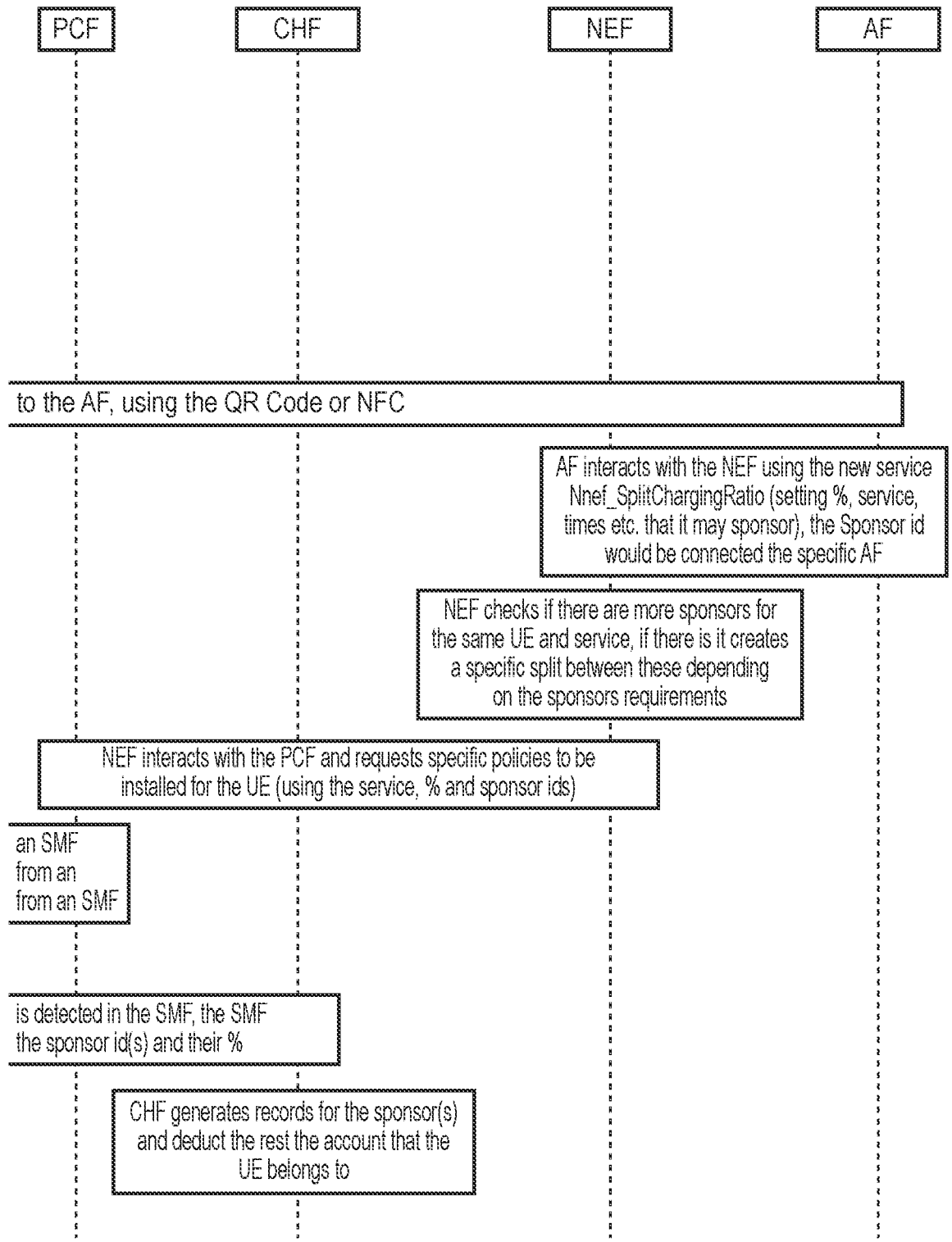

FIG. 8 illustrates end to end message flow according to an Option 1 implementation.

Option 2 envisages multiple individual vendors each proposing to be charged for provision of a certain amount of specific content. This corresponds to receipt at the network of multiple single vendor content specifications.

As set out in 3GPP TS 29.122 V16.0.0 (2018-12), T8 reference point for Northbound APIs (Release 16), an existing Chargeable Party API (Nnef_ChargeableParty) can be modified. This may be used to include split charging of specific additional fields (split charging enable/disable flag, sponsors, percentages (%), services, timing, locations, subscriber types, threshold for split charging) to manage a split charging ratio in the network between multiple sponsors and a subscriber.

A vendor wishing to sponsor content may first provide a content specification informing a network operator, via a new interface, of some or all of the following information:

Content such as services (websites, applications etc.) it wishes to sponsor;

Times (day, night weekends etc.) within which the vendor wishes to sponsor provision of the content;

Locations (e.g. in HPLMN, a particular retail environment etc.) at which the vendor wishes to sponsor provision of the content;

Subscriber types (e.g. belonging to a specific MVNO) eligible for sponsorship of content provision;

How much of a particular content the vendor wishes to sponsor. This may be expressed in absolute terms (as not all subscribers pay the same rates for connectivity) and/or as a percentage;

A maximum sponsorship spend (for example including all sponsorship expenses and setting thresholds for warning).

The network operator then creates an offering/product in the charging system that matches the requirements set out by the vendor. It is possible that more than one vendor may have specified sponsorship of a particular content, which vendors may wish to sponsor the content under different or overlapping conditions and to different percentages/total costs. A charging rule may be created according to which a number of different vendors are associated at different sponsor percentages to form a final split charging ratio (a:b:c: . . . n). This split charging ratio determines how much of a particular session is to be sponsored by the different vendors and how much remains at the charge of the subscriber. For example, if {a, b, c, . . . n} are different percentages for sponsorship by different vendors of content requested by a qualifying subscriber, the total sponsored part of a session for delivery of that content is the total a+b+c+ . . . +n.

A user wishing to access sponsored content requests this offering using any suitable platform. Such platforms may include QR codes, NFC tags, a vendor website, a third party website etc. When a record of delivery of the content is received at the charging system (online or offline) the charging system checks eligible offers and then splits the cost of delivery of the content in accordance with a split charging ratio as discussed above. The user is then informed about how much of the content was sponsored and by which vendors either via their billing procedures or through some kind of messaging such as an SMS.

In some examples, a user may be notified of sponsored content in real time, such that when user is consuming the content, the final Split Charging Ratio information from the network (charging system/CHF) is exposed by the network operator to third parties including a related Application Server or external content provider. An appropriate application function may then inform UEs via their Application clients about the split charging information so that a subscriber is made aware of how much of the current session (accessing the requested content) is sponsored and by which vendors. The AF can subscribe at the NEF to information including the final Split Charging Ratio information for content consumed by users. This information can be obtained by the NEF from the PCF/CHF network functions once the final Split Charging Ratio is determined. As a split charging ratio is determined at the network operator for a session with multiple vendors associated to content, the Split Charging Ratio information may be sent to relevant AFs. The AFs can then in turn notify the application clients over the same session about how much of a current session is sponsored.

Figure 9:
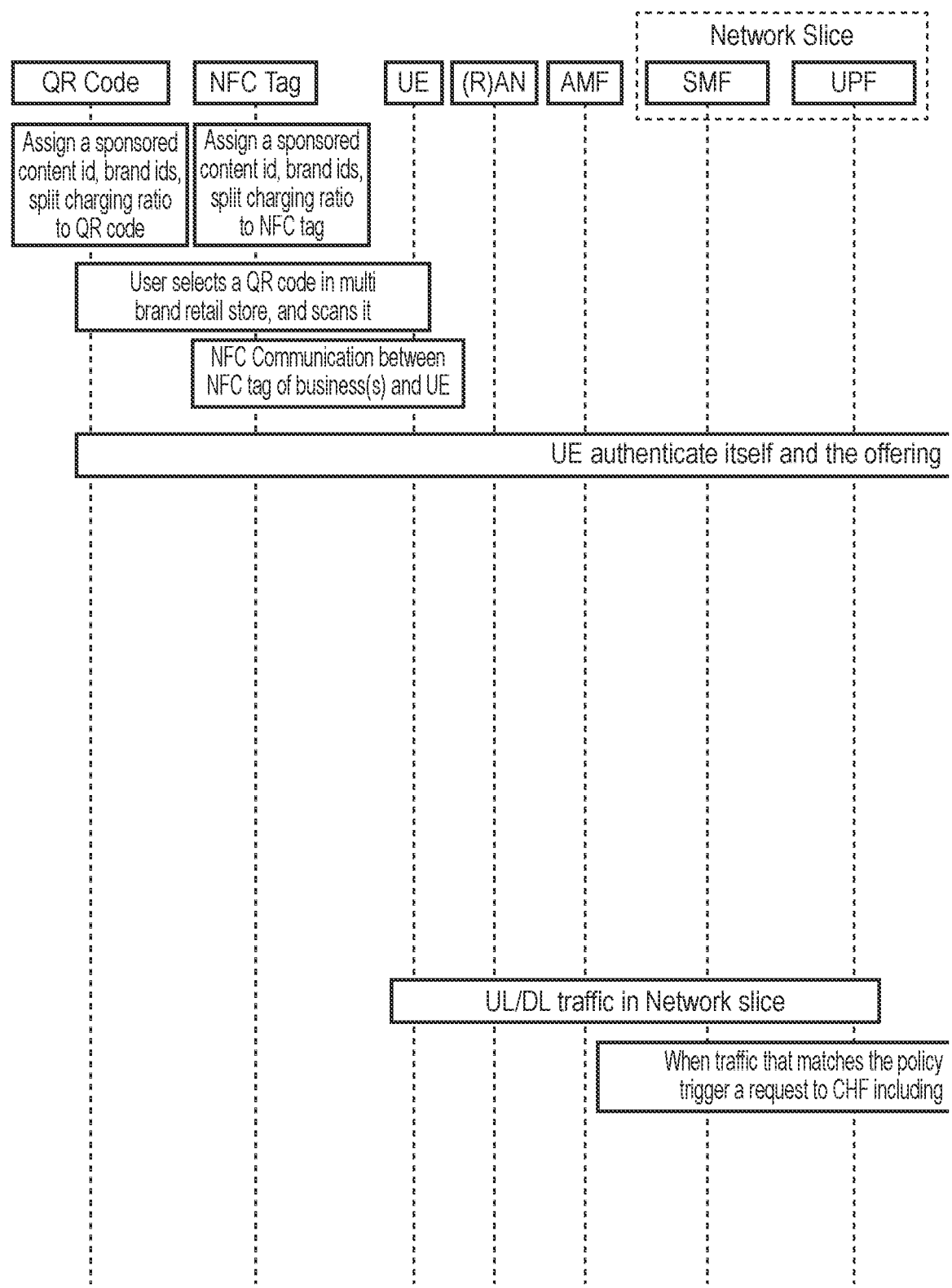
FIG. 9 illustrates end to end message flow according to another implementation of the methods of FIGS. 2 and/or 3a and 3b.
Figure 9:
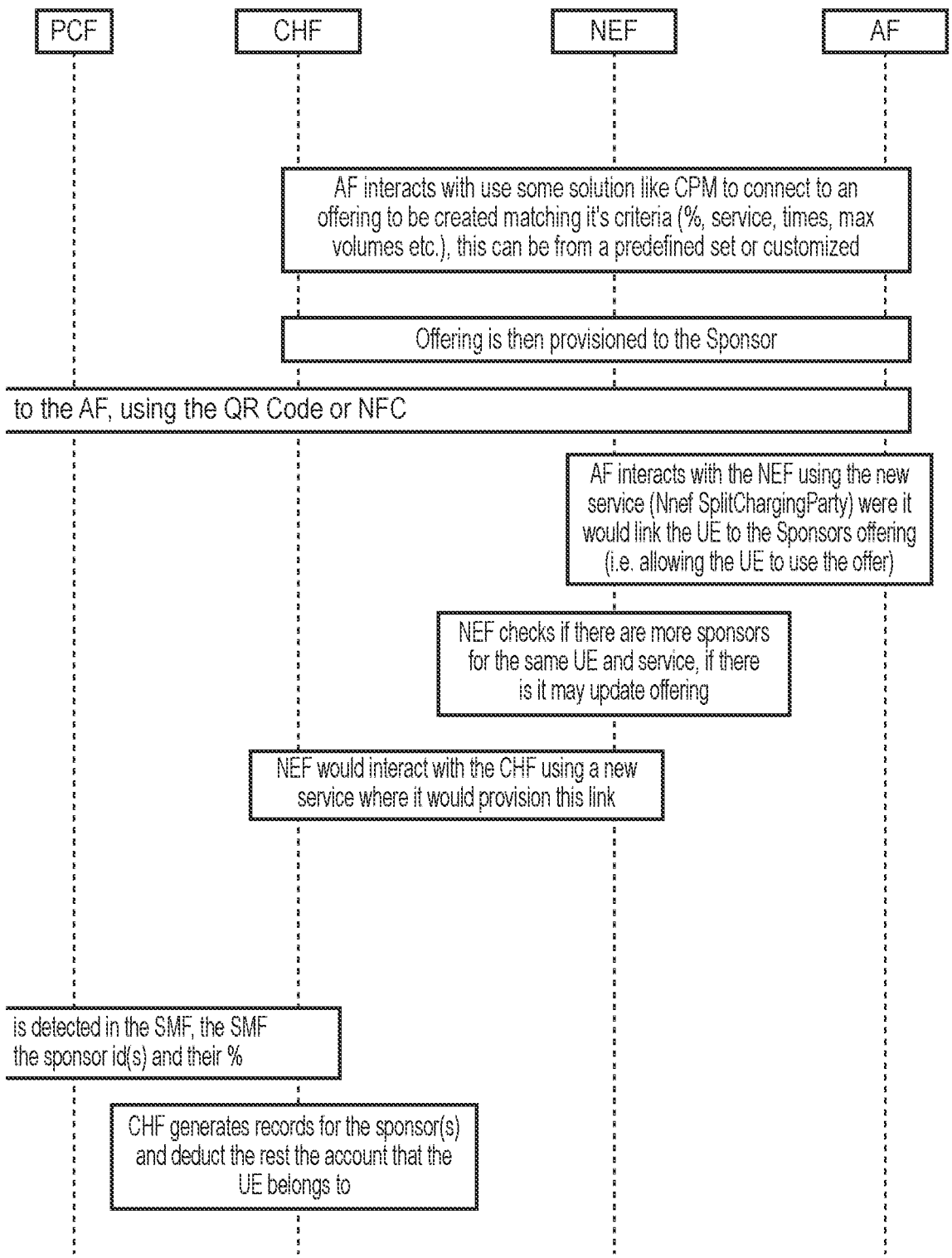

FIG. 9 illustrates end to end message flow according to an Option 2 implementation.

A vendor Application Function connects to an offering to be created that matches its criteria (including for example percentage of content to be sponsored, content, times, maximum volumes etc.). This may achieved through any appropriate solution including for example Converged IP Messaging (CPM). The offering may be selected from a predefined set or customised. The offering is then provisioned to the appropriate vendor (referred to also as a sponsor). A UE then authenticates itself and the offering to the AF, using a QR code, NFC tag etc. The AF interacts with the NEF (for example using the new service discussed above), linking the UE to the sponsors offering and so allowing the UE to use the offer. The NEF checks if there are more sponsors for the same UE and service, and if so may update the offering. The NEF then interacts with the CHF (for example using the new service discussed above) to provision this link. When traffic corresponding to the content is detected in the SMF, the SMF triggers a request to CHF and the CHF generates records based on the offerings the UE is using and deducts charging amounts from the appropriate accounts.

Examples of the method presented in the present disclosure allow businesses to have control over split charging intelligence including ratios for charging between different partner(s) and a subscriber. A wide range of use cases may be envisaged for the methods of the present disclosure, examples of which are discussed below.

Retail Stores

A multi-brand retail store is opened at a location. A business owner or vendor may present on the spot offers or product promotions via QR codes or NFC tags pasted at multiple locations inside the store. Users scan the QR code or NFC tag and business partner(s) sponsor delivery to the user of high resolution/high quality video content associated with the QR code or NFC tag on a 5G enabled user device. The partners divide the cost of sponsoring the content between them according to a split charging ratio (between one or more business partners and the user). As a user roams around inside the store, they may scan multiple QR codes or NFC tags to investigate different offers from different business partners.

A mufti-brand video gaming retail store promotes different game titles by enabling users who are present in the store and have scanned an appropriate QR code or NFC tag to view high resolution/high quality video gaming content. This content is delivered to the user on the basis of a split charging ratio (between one or more business partners and the user) for delivery of the particular content at the particular store and within a time window associated with the offer. Such sponsored access to promotional gaming content may increase customer footprint by allowing gamers to watch high resolution/high quality game video trailers cheaply at the retail store.

Multiple business partners may cooperate to provide a single split charging ratio for selected content delivered to a UE in order to promote a specific product. For example, a user in a multi-brand retail store may scan a QR code or NFC tag for a product. On the basis of the store identity and the time window in which the user scans the code, the user may be offered a split charging ratio {a:b:c} between a manufacturer "a" of the user's device with which it scanned the code, and manufacturers "b" and "c" of components of the product. In the example of a product comprising a laptop computer, the manufacturers of the laptop, its core processing unit, its pre-installed software etc. may all wish to sponsor delivery of promotional content related to the laptop, including for example short term or on the spot offers specific to the laptop, the particular retail store in which the code was scanned and the time window in which it was scanned.

Restaurants

A restaurant seeking to promote on the spot offerings to all people present inside the restaurant may provide QR codes or NFC tags at customer tables. The codes or tags may offer access to content sponsored on the basis of a split charging ratio (between one or more business partners and users or subscribers) for provision of high resolution/high quality video content related to the on the spot offers at the restaurant and available at a given time.

QR codes or NFC tags may also offer access to high quality/high resolution interactive video for providing feedback on particular products or services. Provision of this content may be sponsored by a restaurant owner and one or more business partners according to a split charging ratio.

Transport

A rail operator and its on board catering service may wish to promote on the spot offers during a journey to passengers travelling a particular route at a particular time. QR codes or NFC tags may be placed in carriages to allow passengers to stream information on offers available to them on their UE. As a user scans a code, a split charging ratio may be proposed for delivery of the promotional content between the railway operator, one or more vendors associated with the on board catering service, one or more vendors at a destination of the particular route etc.

Invitation Cards

Invitation cards for significant occasions often include an identification of relevant service providers, including accommodation, catering, entertainment, card design etc., as well as a map to one or more locations for the occasion. A host issuing invitation cards may wish to include a QR code on the invitation that provides access to a range of digital content including for example promotional material for relevant service providers and/or a navigation service providing direction to the relevant locations. Vendors including the occasion venue, caterers, local accommodation, card design companies etc. may propose a split charging ratio for provision of the promotional content and data used by an OTT navigation application to guide participants to the relevant location.

Product Documentation

Product documentation plays an important role in retail product success. Manufacturers increasingly seek to digitise this documentation, and a QR code or NFC tag placed on product packaging may be used to provide access for a purchaser of a product to such content. This may include for example a high resolution/high quality interactive video guide. A user may be offered a split charging ratio (between product manufacturer and telecom subscriber) for streaming the high resolution/high quality video interactive video guide for product documentation.

Examples of the present disclosure thus provide methods enabling vendors to offer sponsored content, controlling how charging for the content is divided between one or more vendors and a user requesting the content. A new service (Nnef_SplitChargingRatio) may facilitate provisioning by vendors of offers for sponsoring of particular content. A final division of charging for content can be generated by a network operator, and can be provided to their parties and/or their application functions. Vendors may in turn use their applications to notify users of sponsored content.

Examples of the present disclosure provide flexibility in allowing vendors to modify and update offers according to developing market conditions, trends or new products, and to tailor their offers with conditions including location based, time based, subscriber based etc. New revenue opportunities for 5G network service providers may arise as a consequence of the increased control and flexibility afforded to vendors for the sponsorship of content delivery.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A non-transitory computer-readable medium having instructions stored therein that are executable by a processing circuitry of a controller to cause the controller to perform operations comprising:
    receiving a content specification comprising:
        an identification of at least two vendors;
        an identification of content for provision over the communication network to a User Equipment, UE, the UE having not accessed the identified content; and
        a condition relating to charging the identified vendors for provision of the identified content to the UE, the condition comprises a threshold for charging for provision of the identified content to an identified vendor, the threshold comprising at least one of:
            an absolute threshold for a quantity of the identified content
            a relative threshold for a quantity of the identified content
            an absolute threshold for a cost of provision of the identified content
            a relative threshold for a cost of provision of the identified content
            a threshold for cost of provision of all the identified content which may be charged at least partially to a vendor;
    creating at least one charging policy for provision of the identified content, the charging policy specifying division of charging for provision of the identified content to the UE between the identified vendors in accordance with the condition in the content specification;
    receiving, from the UE, a request for provision of content over the communication network;
    retrieving the charging policy corresponding to the requested content; and
    creating a charging entry for provision of the requested content, the charging entry dividing charging for provision of the requested content between the identified vendors and a subscriber account associated with the UE in accordance with the retrieved charging policy,
    wherein creating at least one charging policy for provision of the identified content in the content specification comprises creating a rule for division of charging for provision of the content between identified vendors for which a condition relating to charging the identified vendors for provision of the content to a UE is comprised in the content specification, and
    wherein creating the rule comprises creating the rule such that the condition is respected,
    wherein receiving, from the UE, the request for provision of content over the communication network comprises receiving, from the UE, an identification of an offering for content provision, the offering comprising at least one of:
        a content identification;
        a vendor identification; and
        a charging ratio for charging for provision of the identified content between the identified vendor or vendors,
    wherein the offering is accessible to the UE via a platform comprising at least one of:
        a Quick Response, QR, code; and
        a Near Field Communication, NFC, tag,
    wherein the offering received from the UE comprises the charging ratio for charging for provision of the identified content between the identified vendor or vendors, the method further comprising:
        verifying that the charging ratio in the offering is consistent with the retrieved charging policy for the identified content, and
    wherein creation of the charging entry for provision of the requested content is triggered by detection of traffic matching the retrieved charging policy.

2. A method of operating a charging system configured to manage a charging operation in a communications network, the method comprising:

generating a charging policy for providing content to a user equipment, UE, the charging policy specifying a division of a cost of providing the content to the UE between a vendor and a subscriber account associated with the UE, the vendor being separate from an operator of the communications network, wherein the vendor is a first vendor, and wherein generating the charging policy comprises generating a charging policy specifying a division of the cost of providing the content to the UE between the first vendor, a second vendor, and the subscriber account associated with the UE;

determining that the UE has requested the content, wherein determining that the UE requested the content comprises receiving an identification of an offering for provision of the content, and wherein the indication of the offering comprises an indication of a least one of a Quick Response (OR) code and a Near Field Communication (NFC) tag;

generating a charging entry for providing the content to the UE, the charging entry dividing the cost of providing the content to the UE between the vendor and the subscriber account, wherein generating the charging entry comprises attributing at least a portion of the cost of providing the content to the UE to the vendor and generating a charging entry that divides the cost of providing the content to the UE between the first vendor, the second vendor, and the subscriber account; and receiving information associated with the content, the information comprising an indication of a condition relating to charging the vendor for providing the content to the UE, wherein the condition comprises at least one of a geographical condition and a temporal condition.

3. The method of claim 2, wherein the charging system is part of the operator of the communications network, and
wherein determining that the UE has requested the content comprises receiving a request for the content,
the method further comprising:
responsive to receiving the request for the content, providing, via the communications network, the content to the UE.

4. The method of claim 3, wherein providing the content to the UE comprises providing the content to the UE, via the communications network, from an entity that is separate and independent from the vendor.

5. The method of claim 2, further comprising:
responsive to generating the charging entry, directly charging the vendor and the subscriber account based on the charging entry.

6. The method of claim 2, wherein the vendor is not a source of the content.

7. The method of claim 2,
wherein the information further comprises:
an identification of the vendor; and
an identification of the content,
wherein generating the charging policy comprises generating the charging policy based on the information associated with the content.

8. The method of claim 7, wherein generating the charging policy based on the information associated with the content comprises generating a charging policy that includes the condition, and
wherein generating the charging entry comprises:
determining whether the condition is met; and
dividing the cost of providing the content to the UE between the vendor and the subscriber account based on whether the condition is met.

9. The method of claim 2, wherein the condition further comprises a subscription condition relating to a subscriber account associated with the UE.

10. The method of claim 2, wherein the condition further comprises at least one of:
an absolute threshold for a quantity of the identified content;
a relative threshold for a quantity of the identified content;
an absolute threshold for a cost of provision of the identified content;
a relative threshold for a cost of provision of the identified content; and
a threshold for cost of provision of all the identified content which may be charged at least partially to a vendor.

11. The method of claim 2, wherein the offering comprises at least one of:
an identification of the content;
an identification of the vendor; and
an indication of a charging ratio for dividing the cost of providing the content to the UE between one or more vendors including the vendor.

12. The method of claim 11, further comprising:
authenticating the offering via the communication network.

13. The method of claim 2, wherein the content comprises digital information associated with a product or service, the product or service separately providable by the vendor.

14. A controller for managing a charging operation in a communications network, the controller comprising:
processing circuitry; and
memory coupled to the processing circuitry and having instructions stored therein that are executable by the processing circuitry to cause the controller to perform operations comprising:
generating a charging policy for providing content to a user equipment, UE, the charging policy specifying a division of a cost of providing the content to the UE between a vendor and a subscriber account associated with the UE, the vendor being separate from an operator of the communications network, wherein the vendor is a first vendor, and wherein generating the charging policy comprises generating a charging policy specifying a division of the cost of providing the content to the UE between the first vendor, a second vendor, and the subscriber account associated with the UE;
determining that the UE has requested the content, wherein determining that the UE requested the content comprises receiving an identification of an offering for provision of the content, and wherein the indication of the offering comprises an indication of a least one of a Quick Response (OR) code and a Near Field Communication (NFC) tag; and
generating a charging entry for providing the content to the UE, the charging entry dividing the cost of providing the content to the UE between the vendor and the subscriber account, wherein generating the charging entry comprises attributing at least a portion of the cost of providing the content to the UE to the vendor and generating a charging entry that divides the cost of providing the content to the UE between the first vendor, the second vendor, and the subscriber account; and receiving information associated with the content, the information comprising an indication of a condition relating to charging the vendor for providing the content to the UE, wherein the condition comprises at least one of a geographical condition and a temporal condition.

15. The controller of claim 14, wherein the vendor is not a source of the content.

16. The controller of claim 15, wherein the offering comprises at least one of:
- an identification of the content;
- an identification of the vendor; and
- an indication of a charging ratio for dividing the cost of providing the content to the UE between one or more vendors including the vendor, the method further comprising:
- authenticating the offering via the communication network.

* * * * *